May 1, 1951     L. E. W. MONTROSE-OSTER     2,551,502
ARRANGEMENT FOR DETECTING, MEASURING, OR DIRECTLY USING
FOR CONTROL PURPOSES, THE TIME DERIVATIVES OF SPACE
Filed July 15, 1948
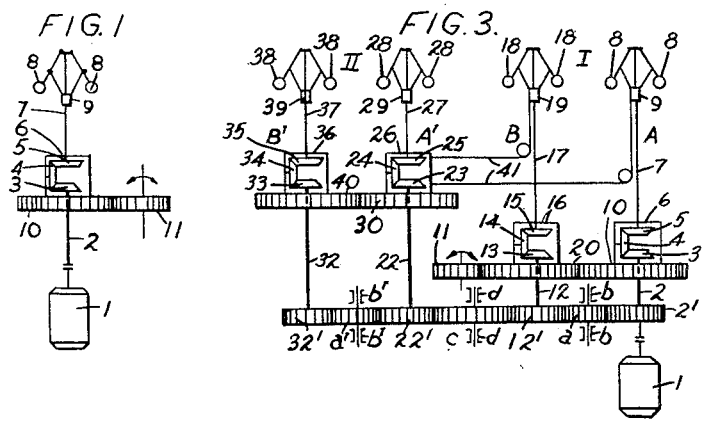
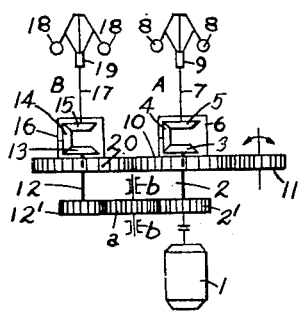
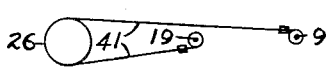
Inventor
Louis Eugene Widolt Montrose-Oster
By
Blair, Curtis + Hayward
Attorneys Patented May 1, 1951

2,551,502

UNITED STATES PATENT OFFICE 2,551,502

ARRANGEMENT FOR DETECTING, MEASURING, OR DIRECTLY USING FOR CONTROL PURPOSES, THE TIME DERIVATIVES OF SPACE

Louis Eugene Widolt Montrose-Oster, Brussels-Boitsfort, Belgium, assignor of one-half to Pollopas Patents Limited, London, England, a British company Application July 15, 1948, Serial No. 38,866
In France May 25, 1945

21 Claims. (Cl. 264—9)

There exists a number of different systems for detecting, measuring and even for directly using, for control purposes, the first time derivative of space, namely velocity.

There are also some systems, although much less in number, which are applicable to the second time derivative, namely acceleration. It should be observed, however, that all these systems, inasmuch as they use mechanical devices, i. e., springs and masses in opposition, with or without damping devices, lack precision. They furnish approximate values only and have to be adjusted and set for each measurement required.

Furthermore, although "velocity" and "acceleration" are both time derivatives of space, there are as yet no contrivances capable of measuring velocity and acceleration based on the same principle for both these operations.

Finally, as regards the higher time derivatives of space, no system is known whereby they can be detected, measured or directly used for control purposes.

This invention relates to an arrangement by which it is possible to detect, measure or directly use, for control or adjustment purposes, as many time derivatives of space as desired.

The invention consists in an arrangement for detecting, measuring or directly using for control purposes, the time derivatives (velocity acceleration, variation of acceleration and higher derivatives) of space comprising a device consisting of a differential gear, one of the three movable parts of which drives a speed responsive device, whilst the second is driven at a constant angular velocity by a suitable motor, and the third is subject to the action (external to the system) to be analysed, wherein for the purpose of neutralising internal and external reactions, two devices of the kind described are combined to form a "group" as will be shown later. For analysing the higher time derivatives, a number of groups, corresponding to the order of the time derivative are used and connected "in cascade."

From another aspect the invention consists in an arrangement for detecting, measuring, or directly using for control purposes, the first time derivative (velocity) of space comprising a pair of differential gears forming a group, means for driving one of the movable parts of each differential gear at a constant angular velocity, two speed responsive devices driven respectively by another of the movable parts of each differential gear, and means for subjecting both the third movable parts of the differential gears to the action to be detected, measured or used, and in such manner that the two speed responsive devices react thereto in opposite directions. For detecting, measuring or directly using for control purposes, the second and higher time derivatives (acceleration, variation of acceleration and higher derivations), a plurality of such groups of differential gears are used, the number of the groups corresponding to the order of the time derivative which it is desired to detect, measure or use, the third movable parts of the differential gears of the second and any following groups being subjected to the displacement of the speed responsive devices of the preceding group.

In order that the invention may be more clearly understood, reference will be made to the accompanying drawing in which:

Fig. 1 represents diagrammatically a device comprising a differential gear, a constant speed motor, and a speed responsive device.

Fig. 2 represents two such devices combined to form a group.

Fig. 3 represents four of such devices forming two groups.

Fig. 4 shows a partial plan view of Fig. 3.

In the constructional examples herein described, which dispense with the use of electricity as a transmission agent, use is made of centrifugal regulators and differential gears, a special association of which makes it possible to obtain the desired results.

It is clear that an ordinary centrifugal regulator cannot be used for obtaining the desired results, firstly because in the neighborhood of a speed equal to zero, the indicators of the same would not be correct, whilst the power it can supply under such conditions would be quite insufficient for any adjustment purposes, and secondly because from rest it always re-acts in the same way to a speed variation, whether it revolves in one direction or in the other. In short, a centrifugal regulator alone is incapable of distinguishing between the positive velocity and the negative velocity of an oscillatory angular movement.

However, these difficulties are overcome in the present invention by running a centrifugal regulator at a constant speed, instead of at rest, in its neutral condition, i. e., when not subjected to a speed variation, so that the runner of the regulator assumes a neutral position corresponding to the normal speed of revolution of the regulator. Therefore, when a speed variation is applied to the regulator to accordingly increase or decrease its speed of revolution, the regulator is enabled to indicate the actual positive or negative angular velocity which caused the change in speed of the regulator, by the extent and direction of the displacement of the runner from its neutral position. A device constructed in accordance with this teaching of the invention is shown in Fig. 1.

A motor 1, running at a constant speed drives through a conventional complete differential system 2, 3, 4, 5, 6, 7 a suitable centrifugal regulator 8, 9. The motor 1 drives the shaft 2 and the centrifugal regulator 8, 9 is driven by the shaft 7, the shafts 2 and 7 being respectively connected to the bevel gears 3 and 5 of the differential which mesh with the bevel gear 4 mounted on the cage 6 of the differential. The cage 6 is mounted on and rotatable relatively to the shafts 2 and 7 and is provided with a toothed gear 10 integral with the cage. When the cage 6 of the differential is stopped, its spindles 2 and 7 (and the motor and the regulator, if they are conected with the spindles without reduction) will rotate at equal speeds but in opposite directions. Under such conditions the runner 9 of the regulator occupies its neutral position. The motion to be analysed is transmitted to the toothed wheel 10 integral with the cage 6 of the differential through a train of gear wheels or any other appropriate means represented in the drawings by a toothed wheel 11.

When a movement of the input gear 11 takes place, either in one direction or in the other, it drives the cage of the differential either in the direction of rotation of the motor (thereby reducing the speed of the centrifugal regulator) or against the direction of rotation of the motor (thereby increasing the speed of the centrifugal regulator). In the first instance, the runner 9 descends along the shaft 7 as viewed in Fig. 1, and in the other case, on the contrary, it ascends. The displacement from the neutral position is directly proportional to the speed of the movement, if care has been taken to choose a suitable centrifugal regulator. It is evident that, as the centrifugal regulator revolves, for an angular velocity of the cage of the differential =0, that is to say in the case when no movement takes place, at a speed corresponding to its normal working, it is capable, even in the case of very slight positive or negative variations, of acting with notable force and without apparent time-lag.

In order to eliminate the re-action exerted by the cage of the differential on the movement transmission, a device as shown in Fig. 1 is combined with another similar device to form a group, according to the invention, as shown in Fig. 2, in which the two devices are designated generally by A and B, of which A is the device of Figs. 1 and B is a second similar device comprising parts 12—20 inclusive which correspond respectively to the parts 2—10 inclusive of the device A. The gear 10 of cage 6 of device A is meshed with the corresponding gear 20 of cage 16 of device B and the motor 1 drives not only the spindle 2 of the device A, but also the spindle 12 of the device B, through pinions 2' and 12' fixed to the spindles 2 and 12 and with an intermediate toothed wheel $a$, the bearings of which are shown at $bb$.

The result of this arrangement is that the reactions exerted by the cages 6 and 16 of the two differentials both tend to make them rotate in the same direction as the motor. Now, as their toothed wheels are directly engaged, these two tendencies neutralise each other. The masses 8, 18, of the regulators, on the other hand, perform opposite movements at each movement transmitted to the gear wheels 10 and 20 by the input gear 11. The effort to be supplied for accelerating one regulator will therefore be compensated by the power recovered by the corresponding deceleration of the other regulator. In short, the system is in external equilibrium as well as in internal equilibrium, that is to say in indifferent equilibrium.

Furthermore a type of regulator must be chosen which displaces the runner in a manner directly proportional to the velocity which it detects of the movement transmitted by the toothed wheels 10, 20. The position of a runner relative to its neutral position thus indicates at every instant the exact value of the positive or negative velocity, (first time derivative). If the runner 9 indicates the value of $$\frac{d\vartheta}{dt}$$

where $\vartheta=$ the radians the motor 1 has moved plus the radians the input gear 11 has moved, then the runner 19 will indicate the value of $$\frac{d\theta}{dt}$$

where $\theta=$ the radians the motor 1 has moved minus the radians the input gear 11 has moved.

To be able to detect, measure or use the second time derivative, it suffices to double the group A plus B above described and to connect the second group "in cascade" relative to the first group, as shown in Fig. 3, in which the two groups are denoted generally by I and II, of which group I is the group A plus B of Fig. 2 and group II is a similar group comprising devices A' plus B'. Parts 22—30 inclusive of device A' and parts 32—40 inclusive of device B' correspond to parts 2—10 inclusive and parts 12—20 inclusive of devices A and B. Also, pinions 22', $a'$, 32' and bearings $b'b'$ of group II correspond to pinions 2', $a$, 12' and bearings $bb$ of group I. The runners 9, 19 of the regulators of group I are connected to the cage 26 of the device A' of group II by some suitable means, such as a chain or cable 41, for driving cage 26 and thereby gear wheels 30, 40 of group II in response to displacement of the runners 9, 19. The chain or cable 41 is attached to the cage 26 so that as the part of the chain or cable connected to one runner unwinds from the cage, the part connected to the other runner winds on the cage, and vice versa, as diametrically shown in Fig. 4, it being remembered from the foregoing that the runners 9, 19 execute movements in opposite directions in response to movement transmitted to the gear wheels 10, 20 by the input gear 11. With this arrangement, while the toothed wheels 10, 20 of group I perform a movement proportional to the movement to be analysed, the toothed wheels 30, 40 of group II perform a movement proportional to the movement of the runners 9, 19 of group I. The toothed wheels 30 and 40 will rotate only to the extent to which runners 9, 19 of the regulators of group I move the input to gear 30 being $$\frac{d\theta}{dt}$$

where $\theta=$ the radians the input gear 11 has moved, which means that the position of the runners 29, 39, of group II, with reference to their neutral position, will indicate at each instant the value of the positive or negative acceleration detected (second time derivative).

The motor 1 driving group I can also drive group II, for instance, through a toothed wheel c the bearings of which are shown at *dd*.

If it be desired to detect the variation of acceleration, that is to say, the third time derivative, it suffices to add a group III identical to those above mentioned, the toothed wheels of the third group being actuated by the runners 29, 39 of the regulators of group II in similar fashion as the gears 30, 40 of group II are driven by the runners 9, 19 of group I.

In order to detect the $n$th derivative, it is necessary to arrange, always in the same manner, namely "in cascade," $n$ groups, so as to neutralise any external and internal reaction, as above described. In such case, the total force to be transmitted by input gear 11 to the toothed wheels 10, 20 is limited to a force sufficiently great to overcome the frictional resistance of the different members and to the force required from the different runners by the apparatus they are adapted to actuate directly.

In cases where the runners of the centrifugal regulators must furnish forces which would necessitate very large regulators, it is preferable to use smaller regulators in conjunction with electric, hydraulic, pneumatic or other servo-motors. The runners will then act, in known manner, on the controls of the servo-motors, which latter can furnish the large forces required.

In the constructional examples described the two spindles of each differential are connected respectively to the motor and the regulator, whilst the external force is exerted on the toothed wheels. There is no objection, however, to inverting the functions, as may be desired.

Although the embodiment described employ centrifugal regulators, the invention is by no means confined to the use of these contrivances. On the contrary, it comprises all equivalent means capable of being employed instead of the centrifugal regulators, namely the employment, in an equivalent arrangement, of any device producing an effect proportional to a velocity, whether it is of an electrical, mechanical, electromechanical, hydraulic or other nature.

I claim:

1. In apparatus capable of detecting, measuring and directly using for control purposes, a time derivative of space, the combination of an even number of three-part differentials and the same number of speed responsive devices associated respectively with said differentials, a first part of each of said differentials driving the associated one of said speed-responsive devices, means for driving a second part of each of said differentials at a constant angular velocity, the third part of each of said differentials meshing with both the first part and the second part, said first and second parts having no direct contact with each other, and means coupling the third parts of said differentials together in paired relation such that said third parts of a pair are rotatable in opposite directions.

2. Apparatus as defined in claim 1, said driving means for said second part of each differential being adapted to drive all said second parts in the same direction of rotation.

3. Apparatus as defined in claim 1, said driving means including a constant speed motor and means for connecting all said second parts of said differentials in driven relation to said motor.

4. Apparatus as defined in claim 3, in which said connecting means include a gear train coupling all said second parts of said differentials together.

5. Apparatus as defined in claim 1, in which said first parts of said differentials all rotate in the same direction.

6. Apparatus as defined in claim 1, in which said third parts of said differentials comprise cages of said differentials.

7. Apparatus as defined in claim 1, in which said speed-responsive devices comprise centrifugal regulators.

8. Apparatus capable of detecting, measuring and directly using for control purposes, the first time derivative (velocity) of space, comprising the combination of a pair of differentials each having three movable parts, a pair of speed responsive devices associated respectively with said differentials, a first part of each differential driving the associated one of said speed responsive devices, means for driving a second part of each differential at a constant angular velocity, the third part of each of said differentials meshing with both the first part and the second part, said first and second parts having no direct contact with each other, and means for applying motion responsive to an external force to the third parts of both said differentials whereby to cause said two speed responsive devices to move responsively thereto in opposite directions.

9. Apparatus as defined in claim 8, said driving means for said second part of each differential being adapted to drive all said second parts in the same direction of rotation.

10. Apparatus as defined in claim 8, said driving means including a constant speed motor and means for connecting all said second parts of said differentials in driven relation to said motor.

11. Apparatus as defined in claim 10, in which said connecting means include a gear train coupling all said second parts of said differentials together.

12. Apparatus as defined in claim 8, in which said first parts of said differentials all rotate in the same direction.

13. Apparatus as defined in claim 8, in which said third parts of said differentials comprise cages of said differentials.

14. Apparatus as defined in claim 8, in which said speed-responsive devices comprise centrifugal regulators.

15. Apparatus capable of detecting, measuring and directly using for control purposes, time derivatives of space, comprising the combination of a series of groups of three-part differentials and speed responsive devices, the number of groups in said series being equal to the number of the highest time derivative to which the apparatus is to respond, each group comprising a pair of said differentials associated respectively with a pair of said speed responsive devices, a first part of each differential driving the associated speed responsive device, means for driving a second part of each differential at constant angular velocity, the third part of each of said differentials meshing with both the first part and the second part, said first and second parts having no direct contact with each other, means coupling together the two third parts of each pair of differentials for rotation in opposite directions whereby to cause the associated pair of speed responsive devices to move in opposite directions responsively to rotary motion of said two third parts, means for applying rotary motion responsive to an external force to the two third parts of the pair of differentials of the first group in said series, and means for applying to the two third parts of the pair of differentials of each succeeding group in said series rotary motion responsive to displacements of the pair of speed responsive devices of the next preceding group.

16. Apparatus as defined in claim 15, said driving means for said second part of each differential being adapted to drive all said second parts in the same direction of rotation.

17. Apparatus as defined in claim 15, said driving means including a constant speed motor and means for connecting all said second parts of said differentials in driven relation to said motor.

18. Apparatus as defined in claim 17, in which said connecting means include a gear train coupling all said second parts of said differentials together.

19. Apparatus as defined in claim 15, in which said first parts of said differentials all rotate in the same direction.

20. Apparatus as defined in claim 15, in which said third parts of said differentials comprise cages of said differentials.

21. Apparatus as defined in claim 15, in which said speed-responsive devices comprise centrifugal regulators.

LOUIS EUGENE WIDOLT
MONTROSE-OSTER.

REFERENCES CITED

The following references are of record in the file of this patent:

UNITED STATES PATENTS

| Number | Name | Date |
|---|---|---|
| 1,101,128 | Jensen et al. | June 23, 1914 |
| 1,395,294 | Pierce | Nov. 1, 1921 |
| 1,728,904 | Herr | Sept. 17, 1929 |
| 2,329,216 | Peters | Sept. 14, 1943 |
| 2,381,225 | Newell | Aug. 7, 1945 |
| 2,399,685 | McCoy | May 7, 1946 |
| 2,458,016 | Morrison | Jan. 4, 1949 |